United States Patent
Noriega

(10) Patent No.: US 11,425,601 B2
(45) Date of Patent: Aug. 23, 2022

(54) POOLING OF BASEBAND UNITS FOR 5G OR OTHER NEXT GENERATION NETWORKS

(71) Applicant: AT&T Intellectual Property I, L.P., Atlanta, GA (US)

(72) Inventor: Dimas Noriega, Woodstock, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/885,941

(22) Filed: May 28, 2020

(65) Prior Publication Data

US 2021/0377801 A1    Dec. 2, 2021

(51) Int. Cl.
*H04W 28/00*    (2009.01)
*H04W 28/08*    (2009.01)
*H04W 28/02*    (2009.01)
*G06N 20/00*    (2019.01)
*H04W 88/14*    (2009.01)
*H04W 88/16*    (2009.01)

(52) U.S. Cl.
CPC ........ *H04W 28/0812* (2020.05); *G06N 20/00* (2019.01); *H04W 28/0284* (2013.01); *H04W 28/0942* (2020.05); *H04W 88/14* (2013.01); *H04W 88/16* (2013.01)

(58) Field of Classification Search
CPC . H04W 28/00; H04W 28/02; H04W 28/0215; H04W 28/0226; H04W 28/0231; H04W 28/0247; H04W 28/0284; H04W 28/0289; H04W 28/08; H04W 28/0812; H04W 28/0942; H04W 88/14; H04W 88/16
See application file for complete search history.

(56) References Cited

U.S. PATENT DOCUMENTS

| | | | |
|---|---|---|---|
| 10,791,507 B1 * | 9/2020 | Mukherjee | H04W 4/029 |
| 10,849,174 B1 * | 11/2020 | Marupaduga | H04M 3/567 |
| 2004/0110534 A1 * | 6/2004 | Chung | H04W 88/085 455/561 |
| 2011/0235514 A1 * | 9/2011 | Huang | H04B 7/15528 370/235 |
| 2012/0014251 A1 * | 1/2012 | Arnott | H04L 5/0007 370/232 |
| 2014/0148175 A1 * | 5/2014 | Luo | H04W 28/08 455/445 |
| 2015/0270882 A1 * | 9/2015 | Shattil | H04B 7/0632 370/329 |

(Continued)

FOREIGN PATENT DOCUMENTS

WO    WO-2019194726 A1 * 10/2019 ............. H04W 4/12

*Primary Examiner* — Kevin D Mew
(74) *Attorney, Agent, or Firm* — Amin, Turocy & Watson, LLP

(57) ABSTRACT

Based on a load prediction analysis performed by a machine learning enabled processor and a load balancer, the load of multiple distributed unit (DU) resources in a baseband unit (BBU) pool hub can be optimized. The BBU pool hub can comprise multiple DU functionality and redundant centralized unit (CU) functionality connected via a high-speed/low latency redundant switch to enable pooling of resources. DU resource pooling can facilitate efficiencies in the network by allocating resources based on active and/or inactive status, load, of radio units RUs as well Radio Bearers activity.

20 Claims, 10 Drawing Sheets

(56) References Cited

U.S. PATENT DOCUMENTS

| | | | |
|---|---|---|---|
| 2015/0305041 A1* | 10/2015 | Kim | H04L 5/0037 |
| | | | 370/329 |
| 2018/0287696 A1* | 10/2018 | Barbieri | H04W 36/08 |
| 2018/0317243 A1* | 11/2018 | Lin | H04L 43/16 |
| 2018/0324663 A1* | 11/2018 | Park | H04W 36/08 |
| 2018/0343646 A1* | 11/2018 | Chou | H04W 16/28 |
| 2018/0368204 A1* | 12/2018 | Park | H04L 5/0048 |
| 2019/0220703 A1* | 7/2019 | Prakash | G06N 20/00 |
| 2019/0223088 A1* | 7/2019 | Pateromichelakis | |
| | | | H04L 41/044 |
| 2019/0289470 A1* | 9/2019 | Vaidya | H04W 16/14 |
| 2019/0297555 A1* | 9/2019 | Hampel | H04L 47/58 |
| 2019/0319742 A1* | 10/2019 | Wu | H04L 1/0013 |
| 2019/0327133 A1* | 10/2019 | Gao | H04W 48/16 |
| 2019/0349139 A1* | 11/2019 | Park | H04W 76/12 |
| 2019/0364527 A1* | 11/2019 | Kwon | H04W 56/0005 |
| 2019/0394738 A1* | 12/2019 | Abedini | H04W 56/0045 |
| 2020/0100130 A1* | 3/2020 | Bahnasy | H04W 88/085 |
| 2020/0100137 A1* | 3/2020 | Panchal | H04W 48/18 |
| 2020/0128414 A1* | 4/2020 | Mishra | H04W 24/02 |
| 2020/0195521 A1* | 6/2020 | Bogineni | H04L 41/5003 |
| 2020/0314732 A1* | 10/2020 | Park | H04W 76/11 |
| 2021/0068183 A1* | 3/2021 | Xu | H04W 76/15 |
| 2021/0092650 A1* | 3/2021 | Ramamurthi | H04W 60/00 |
| 2021/0105191 A1* | 4/2021 | Yang | G06F 11/3409 |
| 2021/0112551 A1* | 4/2021 | Anderson | H04W 72/0453 |
| 2021/0112565 A1* | 4/2021 | Bhaskaran | H04W 24/08 |
| 2021/0127305 A1* | 4/2021 | Xu | H04L 43/0829 |
| 2021/0136627 A1* | 5/2021 | Centonza | H04W 72/087 |

* cited by examiner

POOLING OF BASEBAND UNITS FOR 5G OR OTHER NEXT GENERATION NETWORKS

TECHNICAL FIELD

This disclosure relates generally to facilitating pooling of baseband units. For example, this disclosure relates to facilitating pooling of 4G and 5G baseband units, or other next generation networks.

BACKGROUND

5th generation (5G) wireless systems represent a next major phase of mobile telecommunications standards beyond the current telecommunications standards of $4^{th}$ generation (4G). In addition to faster connection speeds, 5G planning aims at higher capacity than current 4G, allowing a higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption, and lower latency than 4G equipment.

The above-described background relating to a pooling of baseband units is merely intended to provide a contextual overview of some current issues and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
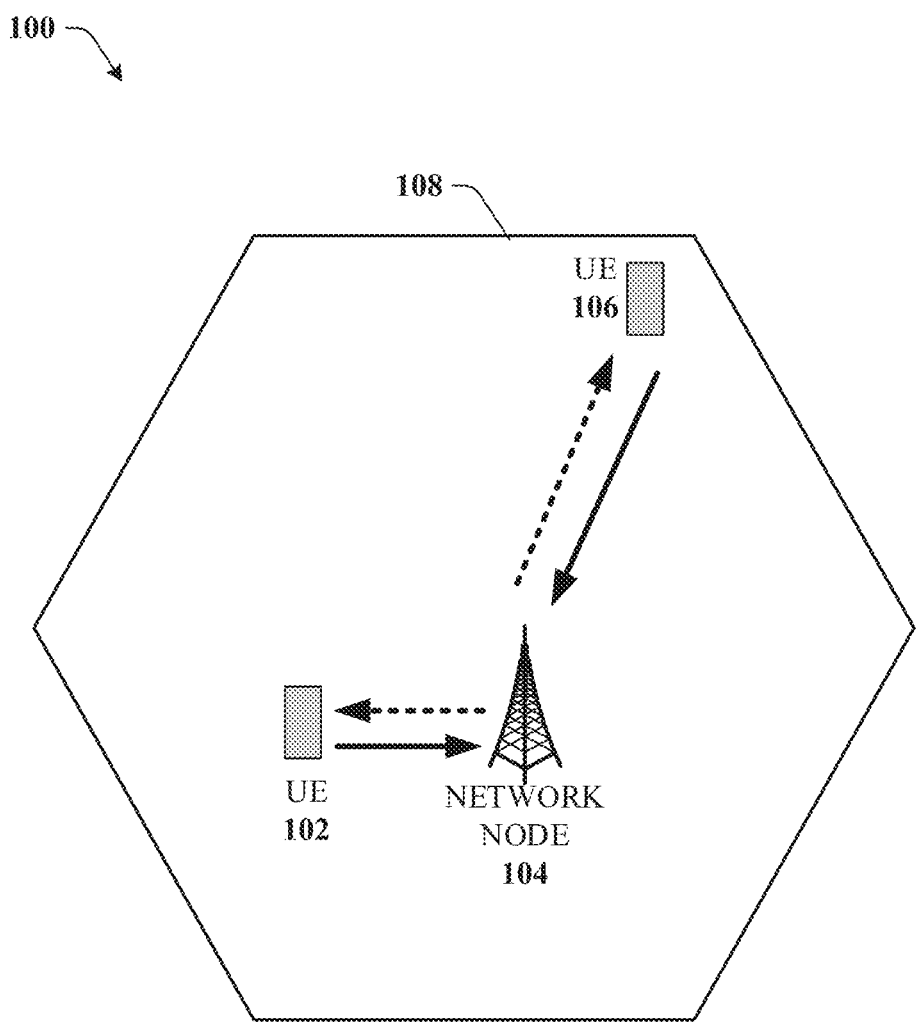
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate pooling of baseband units for a 5G air interface or other next generation networks. For simplicity of explanation, the methods are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be desired to implement the methods. In addition, the methods could alternatively be represented as a series of interrelated states via a state diagram or events. Additionally, the methods described hereafter are capable of being stored on an article of manufacture (e.g., a machine-readable medium) to facilitate transporting and transferring such methodologies to computers. The term article of manufacture, as used herein, is intended to encompass a computer program accessible from any computer-readable device, carrier, or media, including a non-transitory machine-readable medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.12 technology. Additionally, substantially all aspects disclosed herein can be exploited in legacy telecommunication technologies.

Described herein are systems, methods, articles of manufacture, and other embodiments or implementations that can facilitate pooling of baseband units for a 5G network. Facilitating pooling of baseband units for a 5G network can be implemented in connection with any type of device with a connection to the communications network (e.g., a mobile handset, a computer, a handheld device, etc.) any Internet of things (TOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

In some embodiments, the non-limiting term radio network node or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, gNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can include an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with or take the place of policy and charging rules function ("PCRF") network elements so that policies such as quality of service and traffic management and routing can be synchronized and managed end to end.

5G, also called new radio (NR) access, networks can include the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier systems such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

In 4G/5G networks, connections can be established between endpoints before user traffic can be communicated; these connections are called bearers. A bearer is a connection between two endpoints that contains specific information about the traffic class, bit rate, delivery order, reliability, priority, and quality of service for its connection. A bearer may span multiple interfaces. There are two main types of bearers: signaling radio bearers and transport bearers. Signaling radio bearers are established on the control plane in order to allow signaling communication between the UE and gNodeB, and the gNodeB and AMF. Transport bearers are established along the path of the user plane in order to allow transmission of user data to its desired endpoint.

There are three signaling radio bearers that can be established which are solely used for the purpose of transmitting radio resource control (RRC) and NAS messages. Signaling radio bearer 0 (SRB0) is responsible for establishing the RRC connection between the UE and gNodeB. SRB1 is responsible for the exchange of security information, measurement reports, fallback parameters, and handover information. SRB2 is responsible for the transferring of measurement information as well as NAS messages. SRB2 can be configured after the establishment of SRB1 and security activation. Once the SRBs are set up, the UE can be connected to the core network through a specific gNodeB and can be ready to transmit and receive user data.

For a UE to have full network connectivity, the following bearers can be established. The data radio bearer (DRB) can established between the UE and gNodeB CU on the air interface (also referred to as the Uu interface). It can allow direct user data communication between the UE and gNodeB. The S1 bearer can be established between the gNodeB and the appropriate user plane function (UPF) on the S1-U interface. E-UTRAN radio access bearer (E-RAB) can be a combination of the DRB and S1 bearer and creates a connection between the UE and UPF.

This disclosure addresses the service data application protocol (SDAP)/packet data convergence protocol (PDCP)/RLC layers augmentation to allow DU resource pooling for DRB bearers. The SDAP is responsible for mapping 5G QoS bearers, sometimes referred as flows, to radio bearers according to their quality-of-service requirements. This protocol layer is not present in LTE but introduced in NR when connecting to the 5G core network due to the new quality-of-service handling.

The PDCP performs IP header compression, ciphering, integrity protection, retransmissions, in-sequence delivery, and/or duplicate removal in case of handover. For dual connectivity with split bearers, PDCP can provide routing and duplication. Duplication in PDCP can also be used for additional diversity. Packets can be duplicated and transmitted on multiple cells, increasing the likelihood of at least one copy being correctly received. This results in selection diversity. In dual connectivity, a device is connected to two cells, or in general, two cell groups, the master cell group (MCG) and the secondary cell group (SCG). The two cell groups can be handled by different gNBs. A radio bearer is typically handled by one of the cell groups, but there is also the possibility for split bearers, in which case one radio bearer is handled by both cell groups. In this case, the PDCP is in charge of distributing the data between the MCG and the SCG.

For the purpose of this disclosure the PDCP functionality can be augmented assuming a gNB split architecture as follows. In a split architecture, one CU can be connected to multiple DUs. In a BBU in pool morphology, the front plane switch can aggregate (combines the fronthaul traffic for all DUs), and route traffic through the FH_HS to the target RUs. The S1 interface can be common to all DUs within a BBU-pod. There can be multiple paths between CU to RU by selecting different DUs within the pool. In PDCP multi connectivity, a device can be connected to multiple cells, or in general, multiple cell groups. The cell groups can be handled by different DUs. A radio bearer is typically handled by one of the cell groups, but there is also the possibility for split bearers, in which case one radio bearer can be handled by all cell groups. In this case, the PDCP is in charge of distributing the data between groups. For multi-connectivity with split bearers, the PDCP can provide routing and select the best DU component. Within a B-Pod, the augmented PDCP routing function can select alternate paths for flow going to the same RU, (e.g., select from a distinct path CU-$DU_i$-RU for every flow). Every path CU-DUi-RU can be assigned an eagerness factor between 0 and 1. Higher numbers, closer to 1, are the preferred routes. Factor equal to 0 means that a DU is saturated and the path should be avoided. At the start of the routing process, the PDCP entity can generate a random number. If just one route has an eagerness factor larger that the generated random number, the PDCP can select this route. If the random number is less than several eagerness factors, (e.g., several routes are permissible) the PDCP can select randomly between the candidate routes. If no route is available, the PDCP/gNB can invoke CAC/pre-emption algorithms as applicable.

An upper limit for the gain of inner loop pooling (per bearer pooling) can be calculated using the following equation:

$$\gamma \stackrel{\text{def}}{=} \frac{TRP\left(\frac{DUmhz}{TRPabw}\right)}{\left(1 + \rho\left(TRP\left(\frac{DUmhz}{TRPabw}\right) - 1\right)\right)}$$

Where γ is the pooling gain; ρ is the RU utilization; TRP is the number of RUs served by the B-Pod, DUmhz is the processing capacity of the B-Pod and TRPAWB is the processing requirements of each flow. It shall be noted that γ=ρ for larger BBU in pool hubs.

A centralized unit (CU) and distributed unit (DU) can be combined in the same hardware box (e.g., baseband unit). A BBU decomposed into CU and DU is referred as a disaggregated BBU. A 3GPP defined interface, the F1, can be used to link both entities. Furthermore, when disaggregated, a single CU entity can be required to support multiple DUs. Because processing power can be consumed by the DU function, a disaggregation of those components can occur to facilitate pooling of resources.

A common public radio interface (CPRI) standard defines an interface between radio equipment control (REC) and radio equipment (RE). CPRI links can be used to carry data between cell sites and base stations. The purpose of CPRI is to allow replacement of a copper or coax cable connection between a radio transceiver and a base station (typically located at the ground nearby), so the connection can be made to a remote and more convenient location. This connection (often referred to as the fronthaul network) can be a fiber connection to an installation where multiple remote base stations can be served. This fiber connection supports multi-mode communication. The fronthaul (non-packet data) tends to utilize more bandwidth than the backhaul (packet data).

Static CPRI point-to-point connectivity comprises one BBU port processing resources dedicated to one radio. Dense wavelength division multiplexing (DWDM) and coarse wavelength division multiplexing can also be used to decrease fibers sets between site-hubs. At the hub, a DWDM signal can be de-multiplexed and traffic forwarded to the statically pre-assigned BBU resources.

The goal of this disclosure is to centralize BBUs and avoid the one-to-one static mapping RU-BBU currently used by legacy C-RAN based on the CPRI interface. The CPRI interface is closely related to synchronous optical networks (SONET) and provide few tools to perform traffic engineering, capabilities limited to traffic grooming. For 5G, 3GPP defined a new interface between the RU and the DU, the eCPRI interface. The eCPRI interface is a packet-based interface, ethernet. An ethernet based transport layer can be used to achieve transport savings by multiplexing traffic from several sources. An eCPRI based architecture like 5G can be augmented to extend the statistical multiplexing benefits of packet traffic to the processing subsystem DU. The BBU in pool goal is to dynamically allocate baseband unit (BBU) resources to RU radios that are active, (e.g., RUs with active UEs transmitting/receiving packet traffic). Because mobility network radios are active only a fraction of time (e.g., active just a few milliseconds every second), when the radio is silent, the BBU capacity and resources can be provided to other radios. Thus, during inactive periods of one radio, resources can be allocated to other radios. The resource allocation can be performed by monitoring radio activity and then utilizing load balancing procedures.

Various classes of pooling can be utilized. For example, in a first scenario, if one radio is inactive for an extended period of time, (e.g., a radio in a game venue off-game), the radio can be turned off freeing resources on the BBUs that can be allocated to the radios that are active. In another scenario, a set of BBUs, BBUs in a pool, can perform load sharing based on the per TTI on/off nature of the RU traffic. Pooling can be provided in an automatic form (e.g., load balancing, multiplexing, allocation of resources, etc.) for radios being serviced at a given location (e.g., radios in a given building being serviced by a BBU). However, the pooling concept can cover thousands of radios located at a specific area served by a given BBU in a pool.

The current disclosure addresses how for a disaggregated BBU in a pool (e.g., CU+DU in pool), the DU resources can be allocated away from radios that are inactive and allocated to radios that are active. One first approach is to balance the DU utilization per RU granularity taking into account the per RU time of day load fluctuations. Since RUs resource consumption do not peak at the same time, the load to the pool is less than the sum of the max load of individual RUs. The CU can track and predict the traffic patterns and allocate RUs to DUs to minimize the overall processing power required. For example, mapping of RUs to BBUs and/or DUs can be initially performed by 3GPP SON methods. However, the load balancer function can remap the RUs and initiate configuration and/or routing changes on the BBU in a pool and the fronthaul hub switch (FHHS) to better utilize pool resources. The remapping can be performed at specific time intervals and/or as needed.

A BBU comprising a CU plus DU can be visualized as a layer 4 switch-router, (e.g., deep packet inspection/processing router) that takes S1 bearers coming from the core network as general packet radio service tunneling protocol (GTP) tunnels and maps them to the BBU (e.g., CU) to PDCP/RLC radio bearers, flows. A PDCP flow can be activated when traffic is to be sent/received over the radio interface. The BBU in pool can comprise a scheduler that allocates DU resources on a specific DU-RU pair active flow and use a different DU resource for the next flow. Flow routing, (e.g., allocation of the DU element to use) can take into account past and/or current activity and relay on information gathered by external systems like SON. The flow routing information can be used, for example, to populate infiniband (IB) switching tables within a BBU in pool rack (e.g., BBU-pod). For a large BBU in pool site, IB subnet forwarding tables (e.g., infiniband subnet manager and subnet manager agent mobility flow aware) can be used.

The disclosed system can comprise BBU in pool load balancing, per RU load balancing (outer loop load balancing), and per flow load balancing (inner loop load balancing). The outer loop time scale can be several hours and can be performed at the RU level. The inner loop can be at the flow level and the time scale can be several seconds. As described above, the BBU in pool balances the load at the B-Pod level by creating an RU to B-Pod table. The table can be used by the load balancer to trigger FHHS routing table changes and start RU relocation procedures. The assignment goal is to equalize the load across B-Pods and take into account constraints like B-Pods dedicated to a specific NR class (e.g., mmWave). The table RU to B-Pod can be updated periodically to adjust for traffic fluctuations that are correlated to time of day. Recomputing the RU2B-Pod table periodically can decrease the amount of DU resources.

Before a UE can join an 5G network and access voice and data services, it can go through a procedure to identify itself to the network. This process is known as the initial attach procedure and handles the communication of identifiable information from the UE to the 5GC to ensure that the UE can access the network. If the process is successful, then the UE is provided default connectivity, with any charging rules that are applicable and enforced by the LTE network.

In one embodiment, described herein is a method that can comprise receiving, by network equipment comprising a processor via a backhaul connection, packet data from a user plane functionality device. The method can comprise aggregating, by the network equipment, distributed unit resources and a centralized unit resource. The method can comprise determining, by the network equipment, a load status associated a load of a distributed unit device. Based on the load status, the method can comprise selecting, by the network equipment, a distributed unit device to transmit packet data. Additionally, in response to the selecting, the method can comprise sending, by the network equipment, the packet data via the distributed unit to a radio device.

According to another embodiment, baseband unit operations can comprise receiving packet data from a radio access network device comprising a user plane functionality. The operations can comprise aggregating distributed unit functionalities and a centralized unit functionality. Additionally, the operations can comprise determining a status associated with a load of a distributed unit device. Furthermore, based on the determining, the baseband unit operations can comprise sending the packet data via a fronthaul connection to a radio unit device.

According to yet another embodiment, described herein is a machine-readable medium that can perform the operations comprising receiving, via a backhaul connection, packet data from a radio access network device. The machine-readable medium can perform the operations comprising aggregating distributed unit resources and a centralized unit resource. The machine-readable medium can perform the operations comprising determining a load status associated a load of a distributed unit device of a group of distributed unit devices. Furthermore, in response to the determining the load status, the machine-readable medium can perform the operations comprising selecting the distributed unit device to transmit packet data. Additionally, in response to the selecting, the machine-readable medium can perform the operations comprising sending the packet data via the distributed unit device to a radio unit device.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can include one or more user equipment UEs 102, 106. The non-limiting term user equipment can refer to any type of device that can communicate with a network node in a cellular or mobile communication system. A UE can have one or more antenna panels having vertical and horizontal elements. Examples of a UE include a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also include IOT devices that communicate wirelessly.

In various embodiments, system 100 is or includes a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can include a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks that facilitate providing wireless communication services to various UEs, including UE 102, via the network node 104 and/or various additional network devices (not shown) included in the one or more communication service provider networks. The one or more communication service provider networks can include various types of disparate networks, including but not limited to: cellular networks, femto networks, picocell networks, microcell networks, internet protocol (IP) networks Wi-Fi service networks, broadband service network, enterprise networks, cloud-based networks, and the like. For example, in at least one implementation, system 100 can be or include a large scale wireless communication network that spans various geographic areas. According to this implementation, the one or more communication service provider networks can be or include the wireless communication network and/or various additional devices and components of the wireless communication network (e.g., additional network devices and cell, additional UEs, network server devices, etc.). The network node 104 can be connected to the one or more communication service provider networks via one or more backhaul links 108. For example, the one or more backhaul links 108 can include wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD), LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication demands of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may include: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The 5G access network may utilize higher frequencies (e.g., >6 Ghz) to aid in increasing capacity. Currently, much of the millimeter wave (mmWave) spectrum, the band of spectrum between 30 gigahertz (Ghz) and 300 Ghz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

For purposes of this disclosure wireless NR networks can be segmented into different categories: NR S3, serving frequencies below 3 Ghz, with processing requirements similar to LTE due to the carrier BW of MIMO layers being equivalent; NR S6, frequencies above 3 Ghz but less than 6 Ghz, where both massive MIMO and multi-user MIMO can increase processing requirements compared to S3; NR mmWave, frequencies above 20 Ghz with carrier BW exceeding 100 Mhz as well as the number of component carriers exceeding current S3 values.

Figure 2:
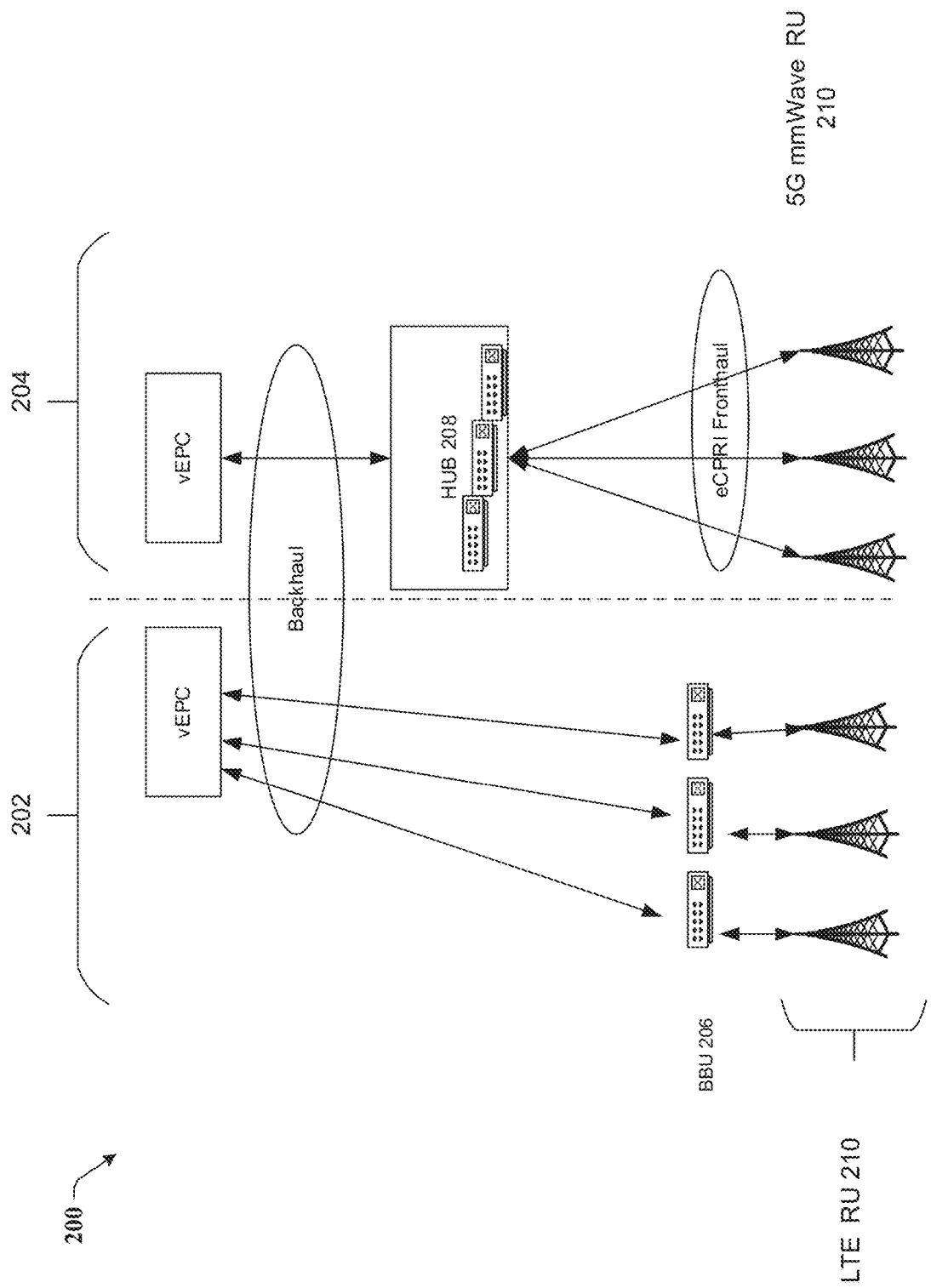
FIG. 2 illustrates an example schematic system block diagram of a distributed radio access network, a centralized radio access network, and a millimeter wave radio unit according to one or more embodiments.

Referring now to FIG. 2, illustrated is an example schematic system block diagram of a hybrid D-RAN/C-RAN radio access network 200, where 5G traffic can be processed by a centralized set of BBUs at hub 208 while LTE traffic is processed by a BBU 206 at the cell site. In a D-RAN morphology, the radio processing node BBU 206 can be collocated with the RU 210: the fronthaul in a short cable connecting the BBU to the RU. In a C-RAN morphology, the BBU can be centralized: fibers are used to connect the RU 210 to the centralized BBU HUB 208.

The densification layer can be centralized, like 5G mmWave, due to space constraints at the RU locations. Legacy C-RAN deployments are based on the concept of BBU hotels, where the BBUs are moved to a central location, but the one to one static mapping is preserved between BBU to RU. The D-RAN and the centralized C-RAN can separately utilize a backhaul and/or a fronthaul. The hub 208 can comprise one or more BBUs that can be utilized to provide resources to the mmW RUs 210. The eCPRI fronthaul is located between the mmW RUs 210 and the BBUs of the hub 208. The backhaul spans from the BBUs 206 to the virtual evolved packet core (vEPC).

Figure 3:
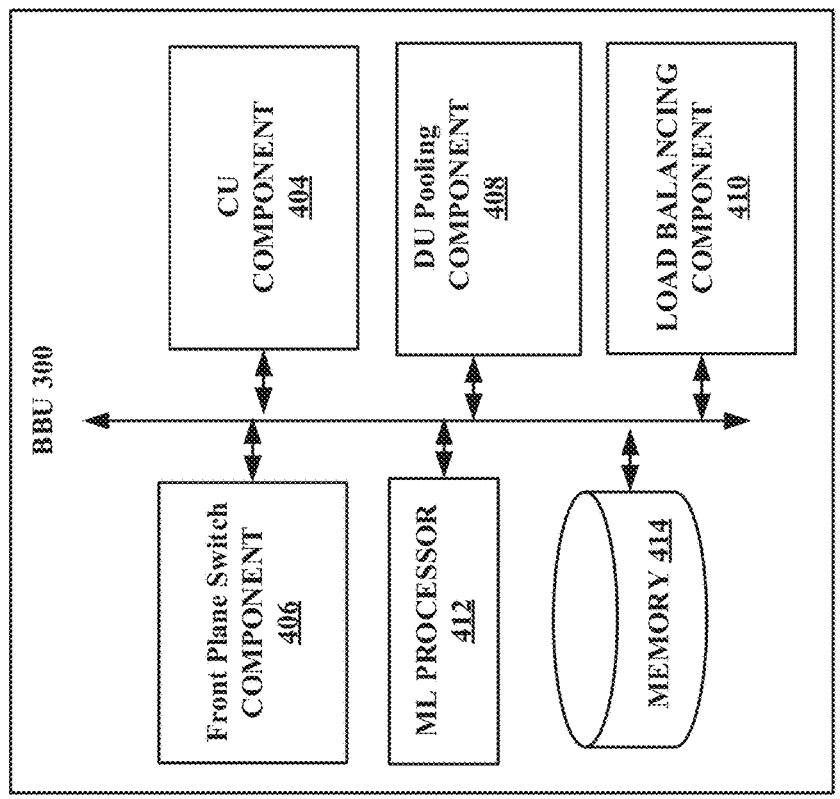
FIG. 3 illustrates an example schematic system block diagram of a baseband unit according to one or more embodiments.

Referring now to FIG. 3, illustrated is an example schematic system block diagram of a baseband unit 300 according to one or more embodiments. Repetitive description of like elements employed in other embodiments described herein is omitted for sake of brevity.

In the embodiment shown in FIG. 3, the BBU in Pool 300 (e.g., B-Pod) can comprise a load balancing component 410 that can analyze and predict radio unit activity to perform load balancing. RU/DU load can be proportional to the number of flows/radio bearers being processed. The load balancer component 410 can evaluate the per BBU-pod (B-pod) load and update FHHS routing tables to balance the traffic received from the RUs 210. Due to the distinct computing requirements of NR S3, NR S6 and NR mmWave, the DU can be preconfigured to address a given NR configuration. The load balancer component 410 can be used to route traffic to the best B-Pod and patterns of traffic evolve, by updates the FHHS routing tables.

It should be noted that in other embodiments, a transmission functionality can be separate from a reception functionality of the BBU 300. The BBU 300 can also comprise a CU component 404, a front plane switch component 406, and a DU pooling component 408. It should be noted that any of the aforementioned components or their sub-components, machine learning (ML) processor 412, and memory 414 can bi-directionally communicate with each other. It should also be noted that in alternative embodiments that other components including, but not limited to the sub-components, ML processor 412, and/or memory 414, can be external to the BBU 300.

Aspects of the ML processor 412 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described by the hub 400. In an aspect, the hub 400 can also include memory 414 that stores computer executable components and instructions.

For downlink traffic, the B-Pod can receive data through an S1 GTP tunnel from a common edge router. The GTP tunnel can be routed to the CU component 404 using a front plane switch forwarding tables. Within a B-Pod there can be several DU pool components 408. The load balancing component 410 can determine the best DU to process the traffic and update the front plane switching tables to ensure that the right F1 instance is used. CU to DU F1 forwarding tables can be built using infiniband, virtual lane, and/or legacy Ethernet VLAN, VLAN switching or infiniband virtual lane switching. Additionally, the load balancing component 410 can track the DU pool component 408 radio load metrics including, but not limited to, PRB load, radio scheduler load, active users, and/or packets per second. Furthermore, if the front plane is built around infiniband, the above radio metrics can be combined to modulate a credit-based link-level flow control or flow control per virtual lane that can be used as measure of the eagerness of a given DU to accept a new flow. Finally, the CU can perform the standard 3GPP procedures to start a DRB bearer, a SDAP/PDCP tunnel.

Figure 4:
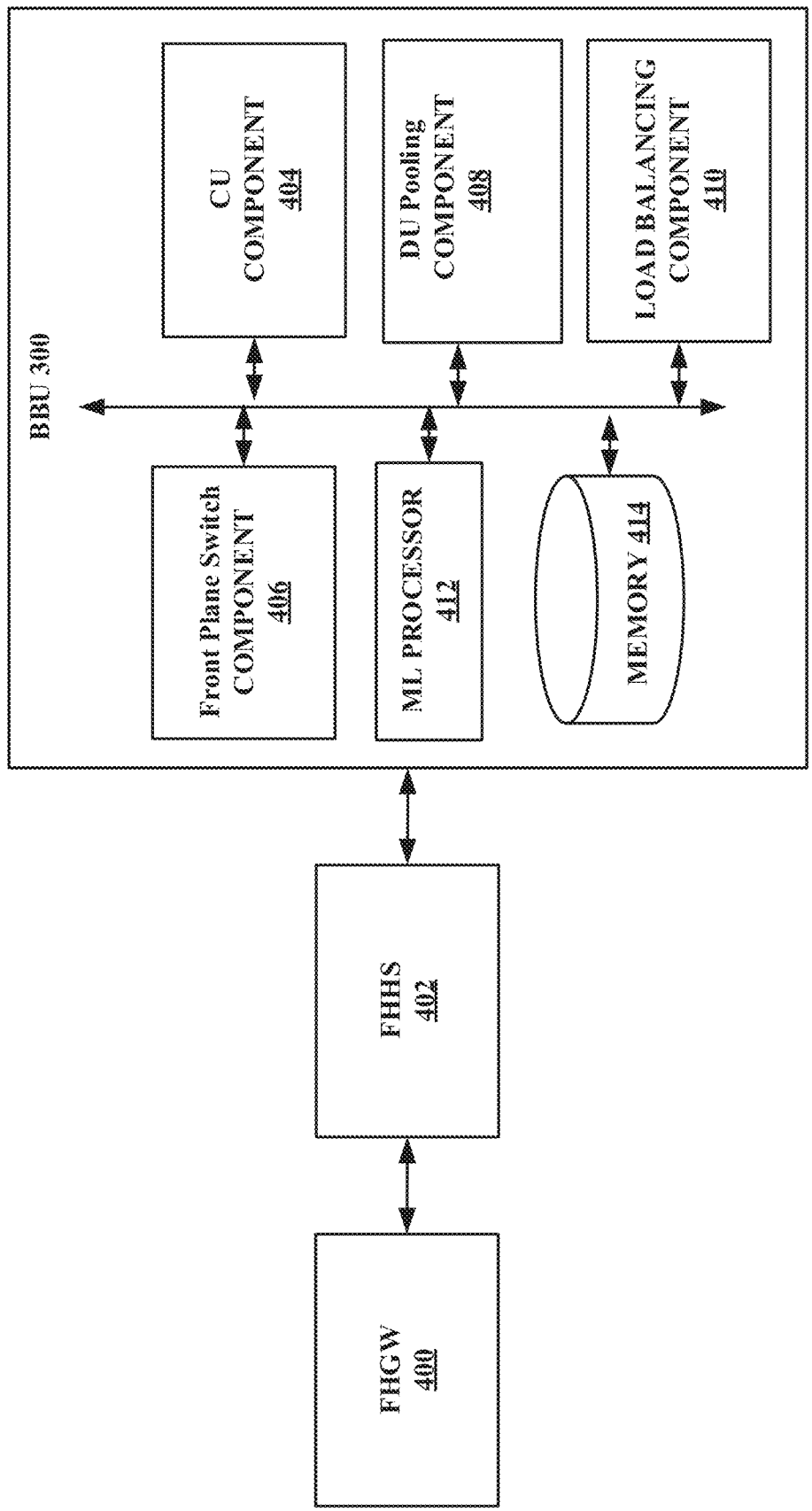
FIG. 4 illustrates an example schematic system block diagram of a baseband unit communicating with a fronthaul hub switch and a fronthaul gateway according to one or more embodiments.

Referring now to FIG. 4, illustrated is an example schematic system block diagram of a baseband unit communicating with a fronthaul hub switch and a fronthaul gateway according to one or more embodiments. FIG. 4 introduces the fronthaul gateway (FHGW) 400 construct to address instances when legacy CPRI RUs are deployed in a network and a fronthaul hub switch 402. The FHGW 400 brings the benefits of packet traffic to legacy radios. For the new C-RAN morphologies, a low-level split (LLS) architecture can be used between the RU and DU. Due to 3GPP hybrid automatic repeat request (HARM) constraints, the 2-way latency between RU and DU must be under 200 microseconds, typically around 125 microseconds. It shall be noted that this short latency is can be aligned with the URLLC requirements.

FHHS 402 can receive one set of multiplexed RU traffic over the fibers from the fronthaul. The FHHS 402 can then demultiplex the traffic from the fibers and send the traffic to the DU pooling component 408. Based on load and activity assessments of the DUs, the FHHS 402 forwarding tables can be updated by the load balancing component 410. The FHHS 402 can receive data from the FHGW 400 deployed at or near the RU site. The FHGW 400 can convert the CPRI to an evolved common public radio interface (eCPRI) to reduce bandwidth.

For CPRI based RU fronthaul, as a rule of thumb, 10 Gbps can support up to 160 Mhz of antenna bandwidth (ABW). For 160 Mhz the theoretical peak throughput per RU can be around 1 Gbps at the S1 interface, user plane traffic. A CPRI based 5G RU, with typical ABW of 1600 Mhz can utilize around 100 Gbps per RU. Therefore, the eCPRI interface can address 5G fronthaul bandwidth (BW) optimization. The theoretical peak throughput of a 5G 1600 Mhz RU can be around 10 Gbps, user plane S1 interface. When using eCPRI split 7.x with compression, the eCPRI BW utilized for a 1600 Mhz TRP can be less than 25 Gbps ((10/6)*2*8). Thus, a 4× bandwidth savings can be achieved by means of eCPRI. Furthermore, since eCPRI is a packet protocol, this can allow for statistical multiplexing of the eCPRI flows from different RUs (e.g., 3 RUs may be served by a single into one single 25 Gbps). CPR can increase the fronthaul transport BW by 10×, while eCPRI is less than 2.5×, using as a reference the user plane traffic at the S1 interface.

For legacy CPRI radios, LTE e.g., a FHGW can perform the CPRI to eCPRI transcoding. The FHGW performs the BBU lower physical layer (LoPhy) functionality for the subtending CPRI radios. The end result is that a common transport protocol, eCPRI, is used between the cell site RUs to the hub DUs. Furthermore, since eCPRI is a packet-based protocol, and thus, it is no longer mandatory to have a static mapping, one to one, RUs to the BBU pool. Within the BBU pool is possible to update the end point (IP address, MAC address, Infiniband end point) to balance the load of the centralized DU resources. FH_HS routing tables shall be updated to forward the traffic to the new processing element. Constructs like VLAN, IP Subnets, infiniband virtual lanes/subnets can be used to achieve this dynamic load balancing scheme.

Figure 5:
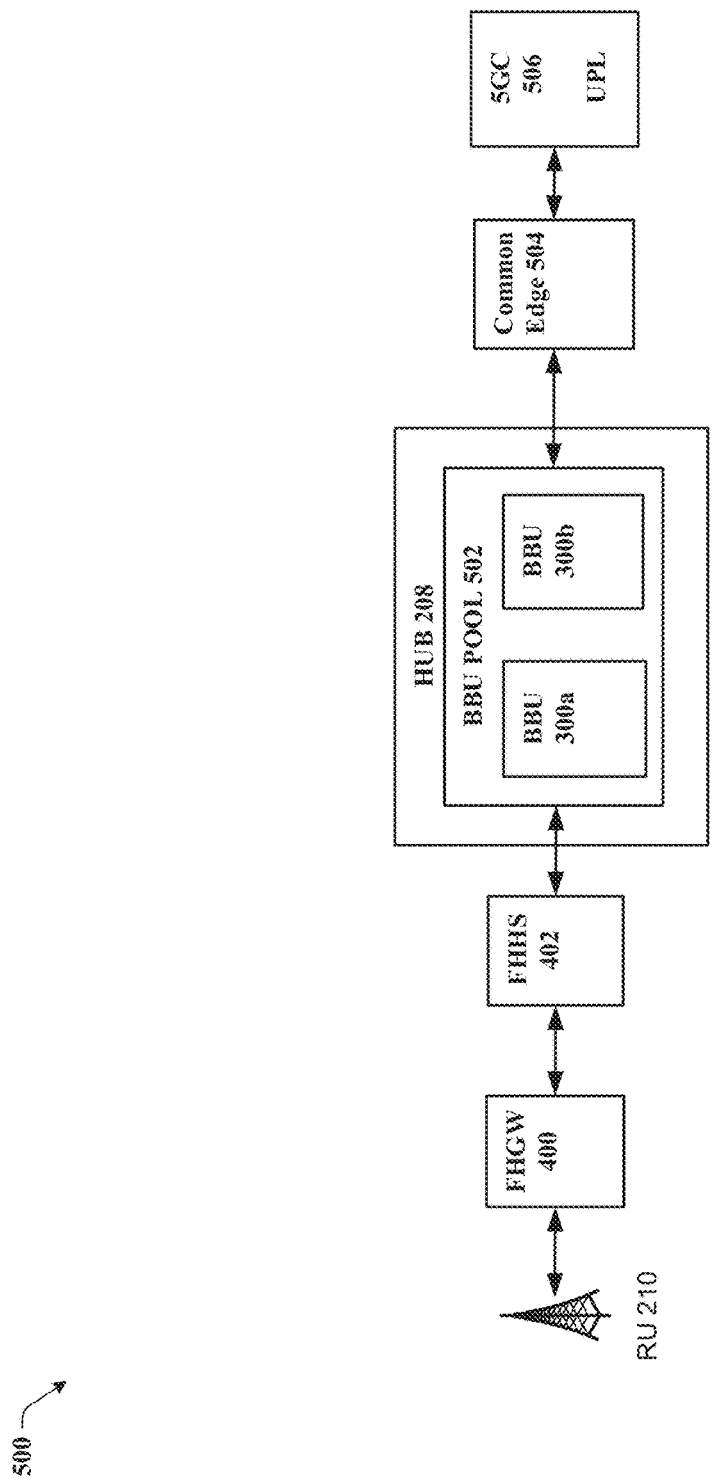
FIG. 5 illustrates an example schematic system block diagram of a centralized radio access network that implements a baseband unit pooling functionality according to one or more embodiments.

Referring now to FIG. 5, illustrated is an example schematic system block diagram of a centralized radio access network that implements a baseband unit pooling functionality according to one or more embodiments. FIG. 5, depicts an example high level architecture (HLA) system 500 diagram of a BBU in pool 502 for a CRAN. If the RUs 210 are not eCPRI compliant, the FHGW 400 can perform a transcoding from CPRI to eCPRI. The RUs 210 to FHGW 400 links can be 10-25 GigE and typical link utilization per RU can be 15-40%. eCPRI traffic can be routed over the fronthaul network (FHGW 400 and FHHS 402) to the BBUs 300a 300b in the hub 208 BBU Pool 502. For redundancy, 2×100 GigE links can be provisioned from the FHGW 400 to the FHHS 402. The hub 208 location can host dozens to hundreds of cell sites. The BBUs 300a, 300b in the BBU pool 502 can be organized in BBU pods (B-Pods). The FHHS 402 can aggregate the cell site traffic and forward it to the correct B-POD. The B-Pod is an autonomous unit and can include the following elements: front plane switch 406, load balancing component 410, optional ML processor 412, DU pooling component 408, and CU component 404.

The initial FHHS 402 forwarding tables can be created by the load balancing component 410 using rules provided by the machine learning processor 412. The ML processor 412 can gather data from the existing network 3GPP self-optimizing networks (SON), network statistics, and/or operator know-how (e.g., the ML processor uses network data including automatic neighbor relationship (ANR) data, TRP/DU capacity metrics like ABW, carriers, etc.) The FHHS 402 routing tables can ensure adequate load balancing between B-Pods and ensure hub availability. The FHHS 402 forwarding tables generation/update component can be present in one or more B-Pods. An edge router of the edge 504 can communicate with the BBU pool 502 by routing traffic via current routing practices. In addition to 3GPP defined nodes, the ML processor 412 can exchange information with data sources defined by other standard bodies like oRAN, IEEE, etc.

The BBUs 300a, 300b in the BBU pool 502 can be in two B-Pod. Each B-Pod can be provisioned with a redundant front plane switch component 406, which can be the ingress/egress gateway to the B-Pod. The front plane forwarding tables can be generated/updated by the load balancer component 410 and ML processor 412. The front plane switch 402 can be built using technologies like infiniband or Ethernet. A single B-Pod instance can serve from 12 to 48 cells sites, depending on the NR traffic mix. To achieve this capacity, a B-Pod typical configuration can comprise 12 DU processing blades and 2 CU processing elements 404. Using the eCPRI load, the bit rates can translate into at least 8×100 GigE eCPRI links from the FHHS 402. For reliability purposes, 4×100 GigE links can be used at the common edge. The total port count can be 48×100 GigE ports per B-Pod. For availability, 2×24 100 GigE front plane switches components 406 can be deployed per B-Pod.

Figure 6:
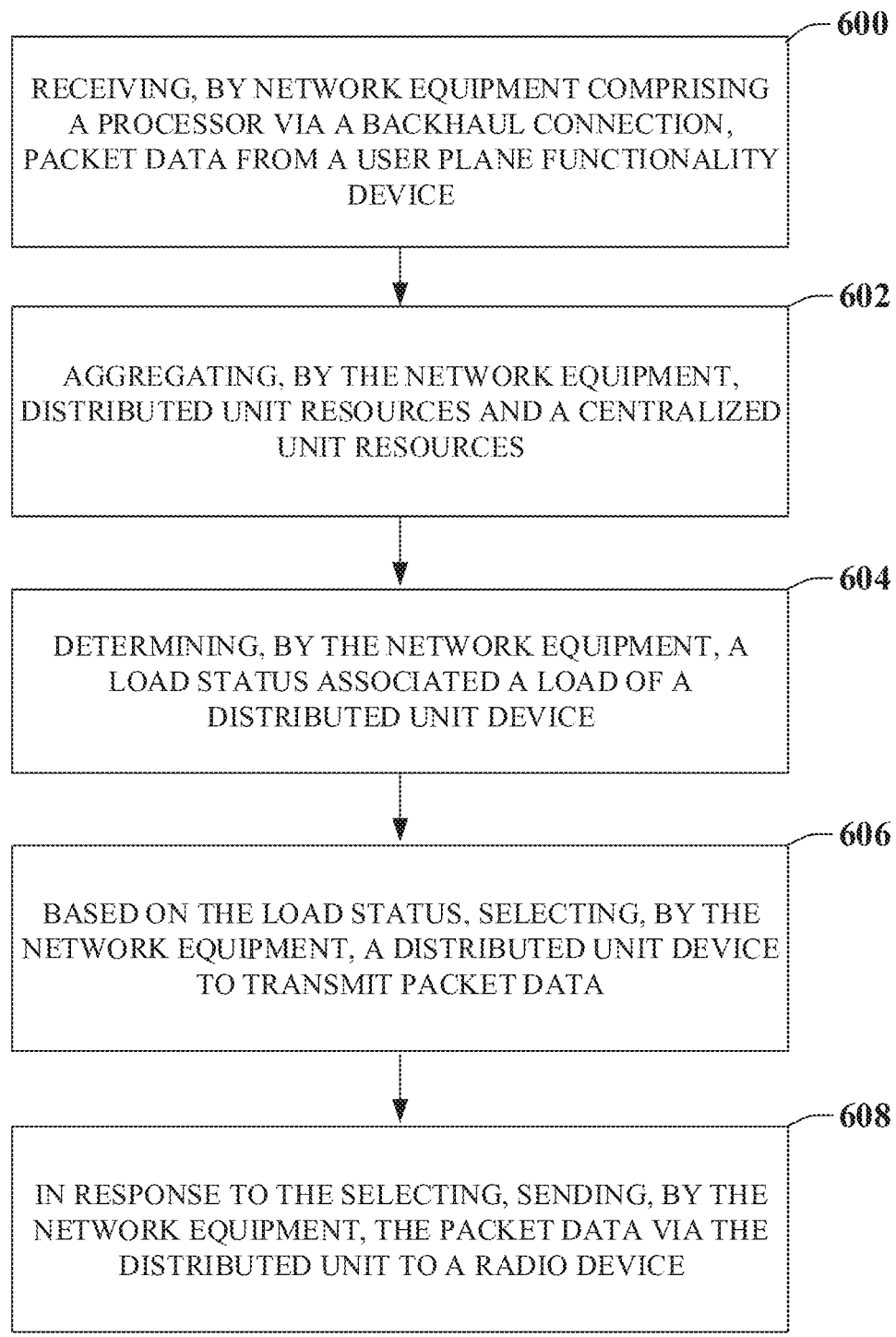
FIG. 6 illustrates an example flow diagram for a method for baseband unit pooling according to one or more embodiments.

Referring now to FIG. 6, illustrated is an example flow diagram for a method for baseband unit pooling according to one or more embodiments.

At element 600, a method can comprise receiving, by network equipment comprising a processor via a backhaul connection, packet data from a user plane functionality device. At element 602, the method can comprise aggregating, by the network equipment, distributed unit resources and a centralized unit resource. At element 604, the method can comprise determining, by the network equipment, a load status associated a load of a distributed unit device. Based on the load status, at element 606, the method can comprise selecting, by the network equipment, a distributed unit device to transmit packet data. Additionally, in response to the selecting, at element 608, the method can comprise sending, by the network equipment, the packet data via the distributed unit to a radio device.

Figure 7:
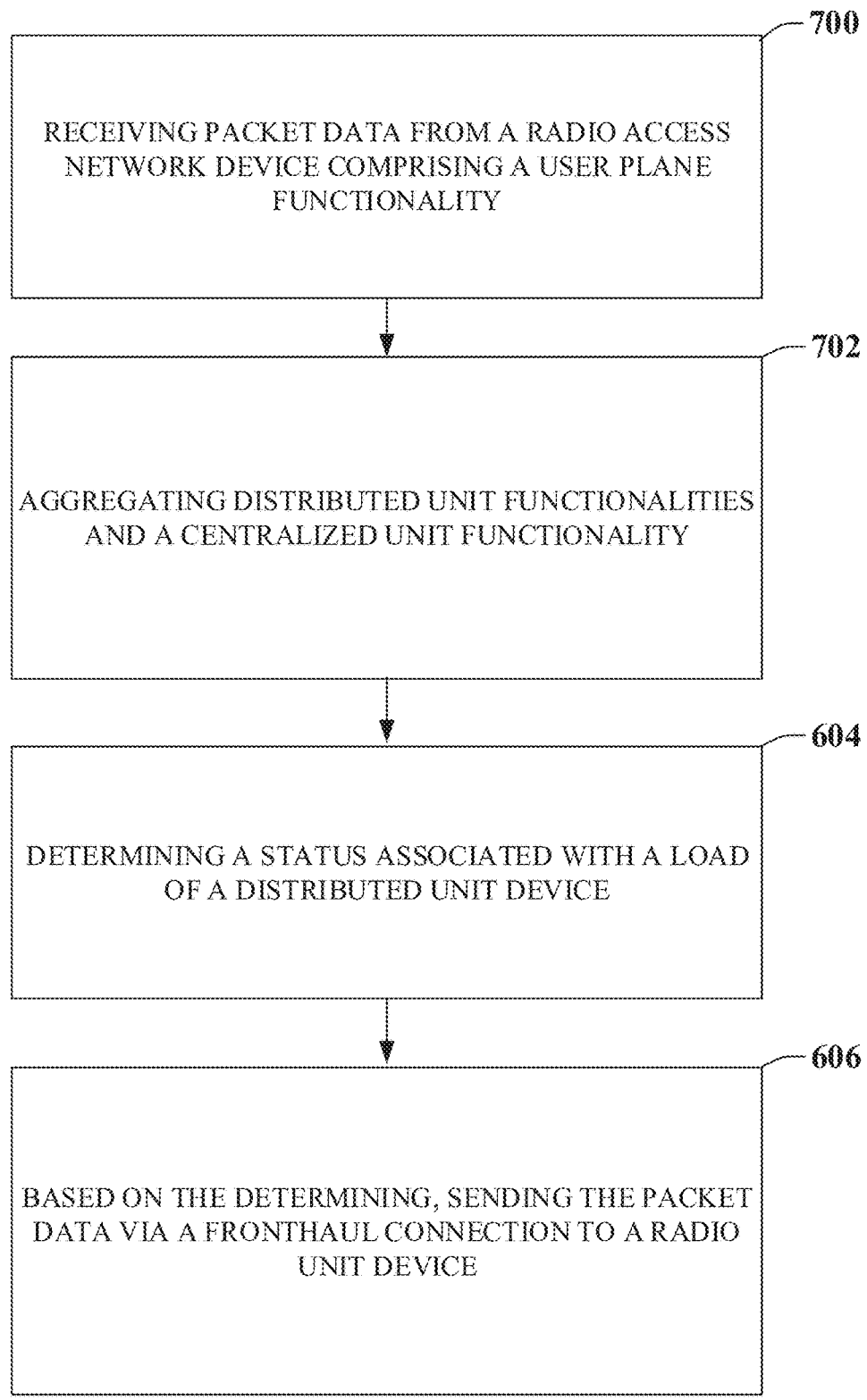
FIG. 7 illustrates an example flow diagram for a system for baseband unit pooling according to one or more embodiments.

Referring now to FIG. 7, illustrated is an example flow diagram for a system for baseband unit pooling according to one or more embodiments.

At element 700, baseband unit operations can comprise receiving packet data from a radio access network device comprising a user plane functionality. At element 702, the operations can comprise aggregating distributed unit functionalities and a centralized unit functionality. Additionally, at element 704, the operations can comprise determining a status associated with a load of a distributed unit device. Furthermore, based on the determining, at element 706, the baseband unit operations can comprise sending the packet data via a fronthaul connection to a radio unit device.

Figure 8:
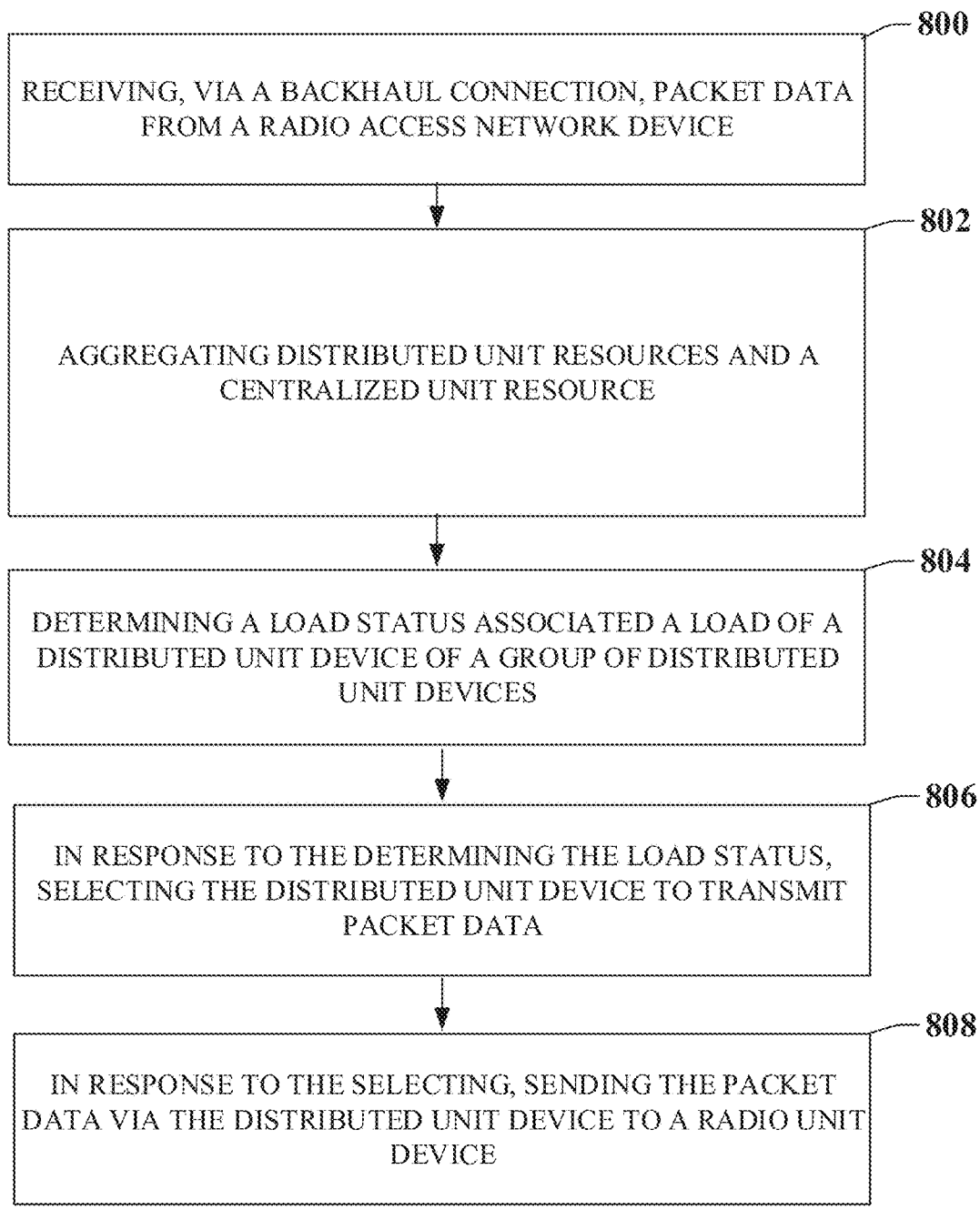
FIG. 8 illustrates an example flow diagram for a machine-readable medium for baseband unit pooling according to one or more embodiments.

Referring now to FIG. 8, illustrated is an example flow diagram for a machine-readable medium for baseband unit pooling according to one or more embodiments.

At element 800, the machine-readable medium can perform the operations comprising receiving, via a backhaul connection, packet data from a radio access network device. At element 802, the machine-readable medium can perform the operations comprising aggregating distributed unit resources and a centralized unit resource. At element 804, the machine-readable medium can perform the operations comprising determining a load status associated a load of a distributed unit device of a group of distributed unit devices. Furthermore, at element 806, in response to the determining the load status, the machine-readable medium can perform the operations comprising selecting the distributed unit device to transmit packet data. Additionally, at element 808, in response to the selecting, the machine-readable medium can perform the operations comprising sending the packet data via the distributed unit device to a radio unit device.

Figure 9:
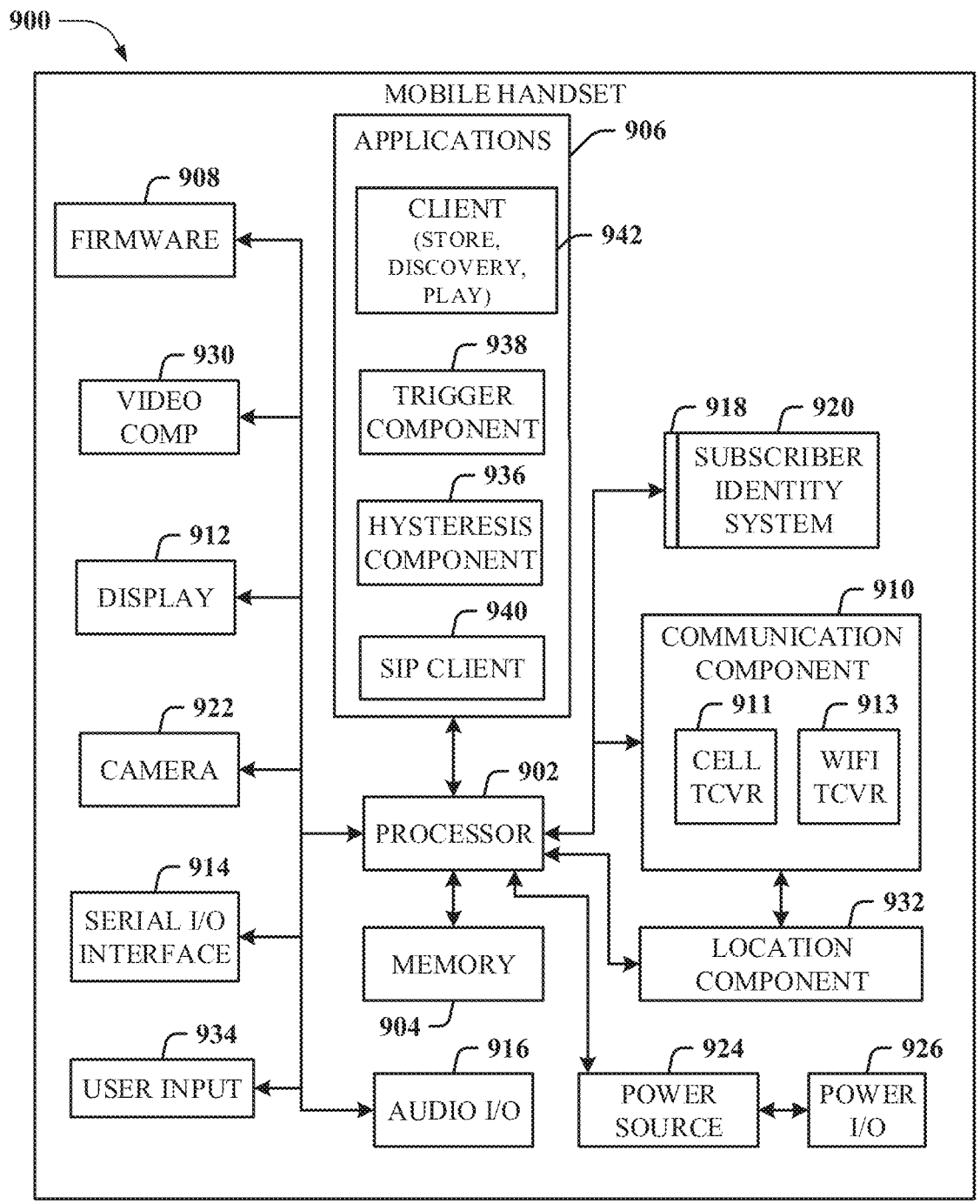
FIG. 9 illustrates an example block diagram of an example mobile handset operable to engage in a system architecture that facilitates secure wireless communication according to one or more embodiments described herein.

Referring now to FIG. 9, illustrated is a schematic block diagram of an exemplary end-user device such as a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied in a machine-readable medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and trouble-shooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
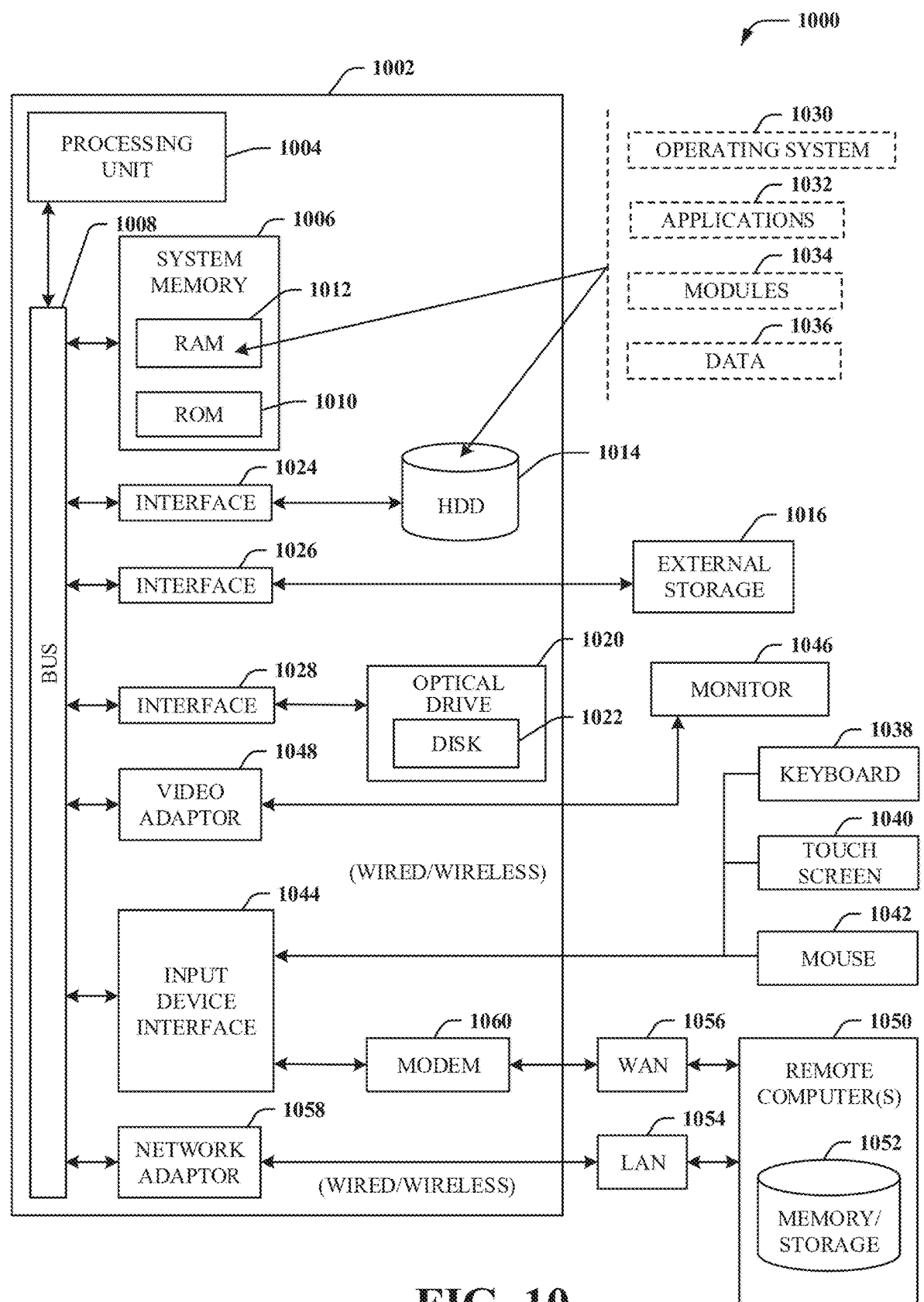
FIG. 10 illustrates an example block diagram of an example computer operable to engage in a system architecture that facilitates secure wireless communication according to one or more embodiments described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the disclosed methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable media, machine-readable media, and/or communications media, which two terms are used herein differently from one another as follows. Computer-readable media or machine-readable media can be any available media that can be accessed by the computer and includes both volatile and nonvolatile media, removable and non-removable media. By way of example, and not limitation, computer-readable media or machine-readable media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally include emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can include one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGS., where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    receiving, by network equipment comprising a processor via a backhaul connection, first packet data from a user plane functionality device;
    aggregating, by the network equipment, distributed unit resources and a centralized unit resource;
    determining, by the network equipment, a load status associated a load of a distributed unit device;
    in response to determining the load status, balancing, by the network equipment, the load, wherein balancing the load comprises balancing the load to be proportional to a number of radio bearers being processed, resulting in a balanced load;
    based on the balanced load, selecting, by the network equipment, the distributed unit device to transmit first packet data;
    in response to the selecting, sending, by the network equipment, the first packet data via the distributed unit device to a radio device; and
    with regard to radio devices associated with distributed unit devices, comprising the distributed unit device, allocating, by the network equipment, the distributed unit resources associated with the distributed unit devices to first radio devices, comprising the radio device, that are determined to be actively communicating second packet data at a specified time and none of the distributed unit resources to second radio devices that are determined to be inactive at the specified time, wherein the radio devices comprise the first radio devices and the second radio devices.

2. The method of claim 1, wherein the load status is representative of an inactivity associated with the distributed unit device.

3. The method of claim 2, wherein the load is predicted based on a previous inactivity of the distributed unit device.

4. The method of claim 2, wherein the load status is a first load status, wherein the load is a first load, and further comprising:
    based on a second load status representative of a second load of the distributed unit device, sending, by the network equipment, the first packet data via a fronthaul connection to the radio device.

5. The method of claim 1, further comprising:
    multiplexing, by the network equipment, a signal carrying the first packet data to decrease a number of wired connections from a first number to a second number less than the first number.

6. The method of claim 1, further comprising:
    in response to the sending, receiving, by the network equipment, third packet data from a another radio device of the first radio devices.

7. The method of claim 6, further comprising:
    in response to the receiving of the third packet data, updating, by the network equipment, a data structure associated with a front plane switch of the network equipment.

8. A baseband unit, comprising:
    a processor; and
    a memory that stores executable instructions that, when executed by the processor, facilitate performance of operations, comprising:
        receiving packet data from a radio access network device comprising a user plane functionality;
        aggregating distributed unit functionalities and a centralized unit functionality;
        determining a status associated with a load of a distributed unit device;
        in response to determining the status, balancing the load, wherein balancing the load comprises balancing the load to be proportional to a number of radio unit devices being processed, resulting in a balanced load;
        based on the balanced load, sending the packet data via a fronthaul connection to the radio unit devices; and
        with regard to the radio unit devices associated with distributed unit devices, comprising the distributed unit device, allocating the distributed unit functionalities associated with the distributed unit devices to a first subgroup of the radio unit devices that is determined to be involved in active data communication during a time period and none of the distributed unit functionalities to a second subgroup of the radio unit devices that is determined to be inactive during the time period.

9. The baseband unit of claim 8, wherein the fronthaul connection comprises a fronthaul gateway located at a radio unit device of the radio unit devices.

10. The baseband unit of claim 9, wherein the fronthaul gateway is a first fronthaul gateway, and wherein the fronthaul connection further comprises a second fronthaul gateway located in the baseband unit.

11. The baseband unit of claim 8, wherein the status is representative of an inactivity of the distributed unit device.

12. The baseband unit of claim 8, wherein the status is a first status, and wherein the operations further comprise:
    determining a second status associated with an activity of a radio unit device of the radio unit devices.

13. The baseband unit of claim 12, wherein the radio unit device is a fifth-generation radio unit device.

14. The baseband unit of claim 12, wherein the radio unit device is a long-term evolution radio unit device.

15. A non-transitory machine-readable medium, comprising executable instructions that, when executed by a processor, facilitate performance of operations, comprising:
   receiving, via a backhaul connection, first packet data from a radio access network device;
   aggregating distributed unit resources and a centralized unit resource;
   determining a load status associated a load of a distributed unit device of a group of distributed unit devices;
   in response to determining the load status, balancing the load, wherein balancing the load comprises balancing the load to be proportional to a number of radio unit devices being processed, resulting in a balanced load;
   based on the balanced load, selecting the distributed unit device to transmit the first packet data;
   in response to selecting the distributed unit device, sending the first packet data via the distributed unit device to a radio unit device of the radio unit devices; and
   with regard to the radio unit devices associated with distributed unit devices, comprising the distributed unit device, assigning the distributed unit resources associated with the distributed unit devices to a first subgroup of the radio unit devices that is determined to be actively communicating second packet data at a given time and none of the distributed unit resources to a second subgroup of the radio unit devices that is determined to be inactive at the given time.

16. The non-transitory machine-readable medium of claim 15, wherein a resource of the distributed unit resources is provided via a fronthaul connection between the radio unit device and a baseband unit hub.

17. The non-transitory machine-readable medium of claim 16, wherein the baseband unit hub comprises a fronthaul gateway system to facilitate the fronthaul connection.

18. The non-transitory machine-readable medium of claim 17, wherein the fronthaul gateway system is collocated with the radio unit device, and wherein the fronthaul gateway facilitates the fronthaul connection between the radio unit device and the baseband unit hub.

19. The non-transitory machine-readable medium of claim 18, wherein the fronthaul connection is facilitated by transcoding a common public radio interface radio to an evolved common public radio interface.

20. The non-transitory machine-readable medium of claim 17, wherein the operations further comprise:
   modifying a data structure to increase a throughput of the fronthaul connection between the radio unit device and the baseband unit hub.

* * * * *